United States Patent
Chang et al.

(10) Patent No.: US 11,762,232 B2
(45) Date of Patent: Sep. 19, 2023

(54) DISPLAY DEVICE

(71) Applicant: AU Optronics (Kunshan) Co., Ltd., Kunshan (CN)

(72) Inventors: Kai Ti Chang, Kunshan (CN); Po-Chun Chiu, Kunshan (CN)

(73) Assignee: AU OPTRONICS (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 17/437,177

(22) PCT Filed: Dec. 27, 2019

(86) PCT No.: PCT/CN2019/129231
§ 371 (c)(1),
(2) Date: Sep. 8, 2021

(87) PCT Pub. No.: WO2021/120309
PCT Pub. Date: Jun. 24, 2021

(65) Prior Publication Data
US 2022/0171233 A1   Jun. 2, 2022

(30) Foreign Application Priority Data
Dec. 16, 2019 (CN) .......................... 201911297006.9

(51) Int. Cl.
*G02F 1/1335* (2006.01)
*G02F 1/1339* (2006.01)

(52) U.S. Cl.
CPC .... *G02F 1/133512* (2013.01); *G02F 1/13398* (2021.01)

(58) Field of Classification Search
CPC ........... G02F 1/133512; G02F 1/13398; G02F 1/13394; G02F 1/13312; G02F 1/13318; G02F 1/133514
See application file for complete search history.

(56) References Cited

U.S. PATENT DOCUMENTS

2021/0096419 A1* 4/2021 Yu .......................... G02F 1/13396
2022/0026771 A1* 1/2022 Yan .................... G02F 1/136209

FOREIGN PATENT DOCUMENTS

| CN | 201859286 U | 6/2011 |
| CN | 105242446 A | 1/2016 |

(Continued)

OTHER PUBLICATIONS

English language translation of Chinese Patent Application Publication No. CN 109100891, published on Dec. 28, 2018. Document downloaded from Espacenet at worldwide.espacenet.com on Mar. 24, 2023. English language translation provided by Google Translate tool on the website. (Year: 2018).*

*Primary Examiner* — Angela K Davison
(74) *Attorney, Agent, or Firm* — WPAT, P.C (57) ABSTRACT

The invention provides a display device, comprising: a first substrate having a display region and a peripheral region adjacent to each other; a second substrate having a first light shield layer and a color resist layer, the color resist layer having a first color resist layer, a second color resist layer and a third color resist layer disposed on the first light shield layer in a strip shape, respectively; a display molecular layer disposed between the first substrate and the second substrate; a first light sensing region disposed on the first substrate and the second substrate; a first spacer region surrounding the first light sensing region, and further comprising: a second light shield layer forming a first projection area on the second substrate; a fourth resist layer forming a second projection area on the second substrate; wherein a ratio of the second projection area to the first projection area is between 0.01 and 0.07.

18 Claims, 9 Drawing Sheets

(56) References Cited

FOREIGN PATENT DOCUMENTS

| | | |
|---|---|---|
| CN | 105629566 A | 6/2016 |
| CN | 109671864 A | 4/2019 |
| CN | 110045533 A | 7/2019 |
| CN | 110148679 A | 8/2019 |

* cited by examiner

DISPLAY DEVICE

BACKGROUND OF THE INVENTION

1. Field of the Invention

The invention relates to a display device, and particularly to a display device having optical sensing elements.

2. Related Art

With development of science and technology, display devices are widely applied to many electronic products, such as, mobile phones, tablet computers, watches, and the like. Meanwhile, in order to satisfy more requirements, most of the electronic products are mounted with elements having optical sensing functions, such as cameras.

The existing optical sensing elements are often mounted on front and back faces of the electronic product, and when the optical sensing elements are mounted on the front face of a display panel, two methods are often used. One is through hole mode, and the through hole is disposed on the display panel, such that the optical sensing elements are directly placed below a filter glass layer. The other is blind hole mode, and the through hole is not disposed on the display panel, such that the optical sensing elements are directly placed below the display panel. When the blind hole mode is used, a circle of isolated region is formed around the blind hole, and in an ideal situation, the isolated region shall display black, and other regions are normal display mode. However, a planarization layer of the isolated region and a planarization layer of other regions have inconsistent heights, such that a display molecular layer cannot fully fill the isolated region, and the isolated region is isolated by a single color resist layer, so a single colored ray is leaked out, and the isolated region displays different colors, thereby exerting an influence on sensing effect of the optical sensing elements, and also appearance effect of the product.

Therefore, how to better avoid leakage of a single colored ray from an isolated region, reduce influence of light leakage on optical sensing elements, and improve appearance effect of the product is actually one of the problems to be solved.

SUMMARY OF THE INVENTION

The embodiments of the invention provide a display device, which can better maintain thicknesses of planarization layers, reduce leakage of a single colored ray from an isolated region, lower influence of light leakage on optical sensing elements, and improve appearance effect of the product.

The display device in one embodiment of the invention comprises a first substrate having a display region and a peripheral region adjacent to each other; a second substrate having a first light shield layer and a color resist layer, the color resist layer having a first color resist layer, a second color resist layer and a third color resist layer disposed on the first light shield layer in a strip shape, respectively; a display molecular layer disposed between the first substrate and the second substrate; a first light sensing region disposed on the first substrate and the second substrate; a first spacer region surrounding the first light sensing region, and further comprising: a second light shield layer forming a first projection area on the second substrate; a fourth resist layer forming a second projection area on the second substrate; wherein a ratio of the second projection area to the first projection area is between 0.01 and 0.07.

In the display device, the fourth color resist layer uses the same film layer as the first color resist layer, the second color resist layer or the third color resist layer.

In the display device, the fourth color resist layer has a plurality of fourth color resist layer units.

In the display device, each of the fourth color resist layer units is cylinder-shaped, and a vertical projection of each of the fourth color resist layer units on the second substrate is dot-shaped.

In the display device, the plurality of fourth color resist layer units are arranged uniformly.

In the display device, the first spacer region further comprises a fifth color resist layer forming a third projection area on the second substrate, wherein a ratio of a sum of the second projection area and the third projection area to the first projection area is between 0.01 and 0.07.

In the display device, the fifth color resist layer uses the same film layer as the first color resist layer, the second color resist layer or the third color resist layer.

In the display device, the fifth color resist layer has a plurality of fifth color resist layer units.

In the display device, the plurality of fifth color resist layer units are arranged uniformly.

In the display device, the first spacer region further comprises a sixth color resist layer forming a fourth projection area on the second substrate, wherein a ratio of a sum of the second projection area, the third projection area and the fourth projection area to the first projection area is between 0.01 and 0.07.

In the display device, the sixth color resist layer uses the same film layer as the first color resist layer, the second color resist layer or the third color resist layer.

In the display device, the fourth color resist layer, the fifth color resist layer and the sixth color resist layer are different film layers.

In the display device, the fourth color resist layer has a plurality of fourth color resist layer units, the fifth color resist layer has a plurality of fifth color resist layer units, and the sixth color resist layer has a plurality of sixth color resist layer units.

In the display device, the plurality of fourth color resist layer units, the plurality of fifth color resist layer units or the plurality of sixth color resist layer units are arranged uniformly.

In the display device, the plurality of fourth color resist layer units, the plurality of fifth color resist layer units or the plurality of sixth color resist layer units are arranged to be spaced apart from each other.

In the display device, it further comprises a second light sensing region, and a second spacer region surrounding the second light sensing region.

In the display device, the first spacer region and the second spacer region have a seventh color resist layer, an eighth color resist layer or a ninth color resist layer therebetween disposed on the second substrate in a strip shape.

Hereinafter the invention is described in details with reference to the accompanying drawings and the detailed embodiments, but the invention is not limited thereto.

DETAILED EMBODIMENTS OF THE INVENTION

Figure 1A:
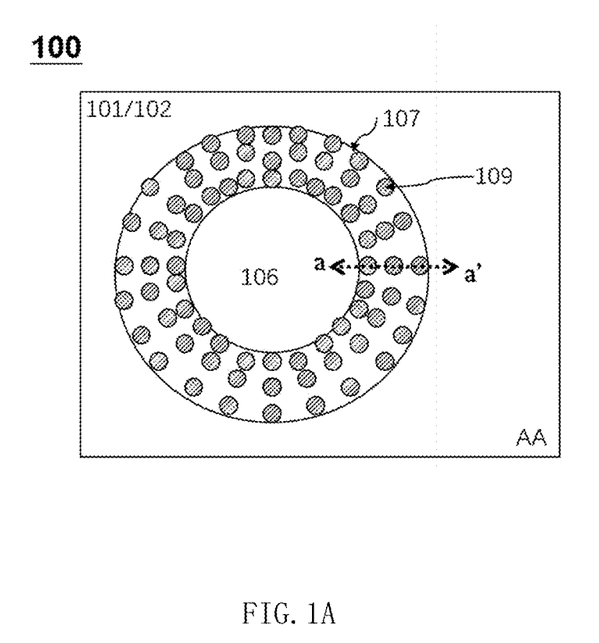
FIG. 1A is a structural diagram of a display device in one embodiment of the invention.
Figure 1B:
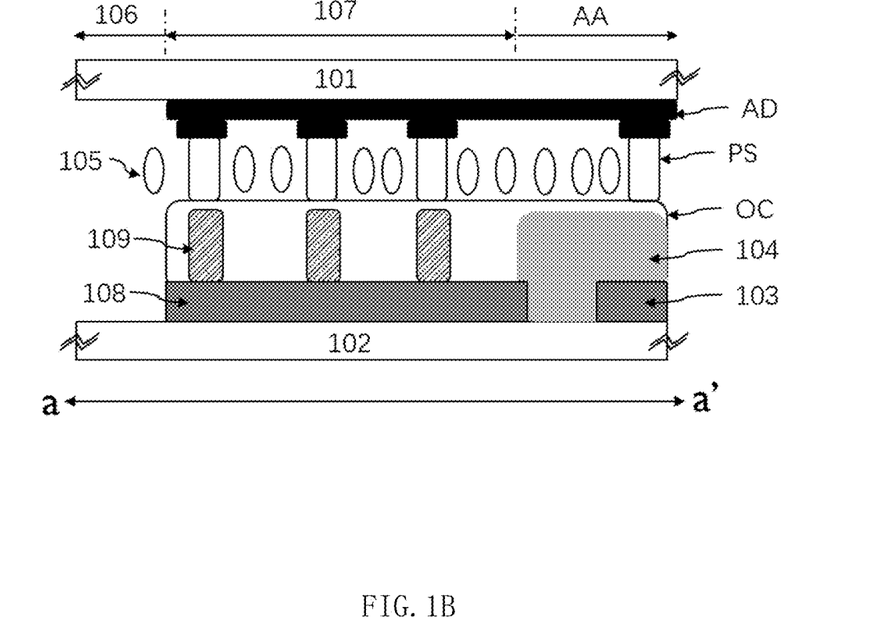
FIG. 1B is a sectional diagram along a section line a-a' in FIG. 1A.

Hereinafter structure principle and working principle of the invention are described in details with reference to the accompanying drawings:

FIG. 1A is a structural diagram of a display device in one embodiment of the invention, and FIG. 1B is a sectional diagram along a section line a-a' in FIG. 1A. As shown in FIGS. 1A and 1B, the display device 100 comprises a first substrate 101, a second substrate 102 and a display molecular layer 105 between the first substrate 101 and the second substrate 102. The first substrate 101 and the second substrate 102 are opposite to each other. In this embodiment, the first substrate 101 has a display region AA and a peripheral region BA (not shown) adjacent to each other, for example, the first substrate 101 is an active array substrate having a multi-layered structure to form an active element array AD, and the details are not described here. A first light shield layer 103 is disposed in a region corresponding to the display region AA on the second substrate 102, and has an opening, and a color resist layer 104 is formed in the opening of the first light shield layer 103. The color resist layer 104 can be formed of a first color resist layer (such as, color resist B), a second color resist layer (such as, color resist R) and a third color resist layer (such as, color resist G) disposed on the second substrate 102 in a strip shape, such that the color resist layer 104 can be received in the opening of the first light shield layer 103. In addition, a planarization layer OC is also formed on the second substrate 102, and a spacer PS is further disposed between the first substrate 101 and the second substrate 102. The details are not described here.

In this embodiment, a first light sensing region 106 and a first spacer region 107 are further disposed in the display device 100. Specifically, the first light sensing region 106 is circular, and also may be designed to a square, an oval or other shapes depending on needs, but the invention is not limited thereto. The first spacer region 107 surrounds the first light sensing region 106, such that the first spacer region 107 is between the display region AA and the first light sensing region 106. For example, the first light sensing region 106 may be disposed in the display region AA, such that a periphery of the first light sensing region 106 is the display region AA. In addition, the first spacer region 107 is disposed between the first light sensing region 106 and the display region AA, such that the first spacer region 107 may function as a transition region between the first light sensing region 106 and the display region AA.

Specifically, referring to FIG. 1B, a second light shield layer 108 and a fourth resist layer 109 are disposed in the first spacer region 107. The second light shield layer 108 forms a projection area S1 on the second substrate 102, and the fourth resist layer 109 forms a projection area S2 on the second substrate 102, wherein a ratio of the projection area S2 to the projection area S1 shall satisfy the following relationship: 0.01≤S2/S1≤0.07, such that the problem of light leakage from the first light sensing region 106 can be reduced. When S2/S1≤0.01, since a density of the fourth resist layer 109 is relatively small, it easily causes that heights of a planarization layer OC extending to the first spacer region 107 and a planarization layer OC corresponding to the display region AA are inconsistent, and when S2/S1≥0.07, since a density of the fourth resist layer 109 is relatively large, a thickness of the planarization layer OC of the first spacer region 107 is larger than a thickness of the planarization layer OC corresponding to the display region AA. In this embodiment, the second light shield layer 108 is formed on the first spacer region 107 by the way of an entire region, i.e., in the first spacer region 107, the second light shield layer 108 does not have any opening formed by patterning. In other words, the second light shield layer 108 can be regarded as a defining scope of the first spacer region 107.

Referring to FIGS. 1A and 1B again, in this embodiment, the fourth resist layer 109 can be made of the same film layer as the first color resist layer, the second color resist layer or the third color resist layer, i.e., any one of color resists R, G and B. To be specific, the fourth resist layer 109 is formed of a plurality of fourth color resist layer units, and accordingly, the projection area S2 is a sum of projection areas formed by all fourth color resist layer units on the second substrate 102. In this embodiment, for example, if each of the fourth color resist layer units is cylinder-shaped, a vertical projection thereof on the second substrate 102 is dot-shaped. Of course, the fourth color resist layer units also can be squares, ovals or other shapes, but the invention is not limited thereto. In addition, the plurality of fourth color resist layer units can be arranged uniformly, and also can be arranged dispersively, only if the ratio of S2 to S1 can be satisfied.

Figure 2A:
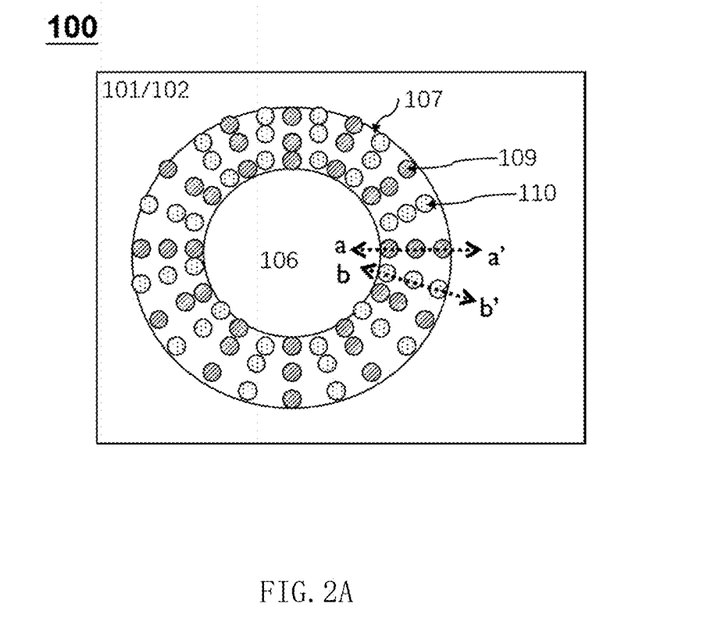
FIG. 2A is a structural diagram of a display device in another embodiment of the invention.
Figure 2B:
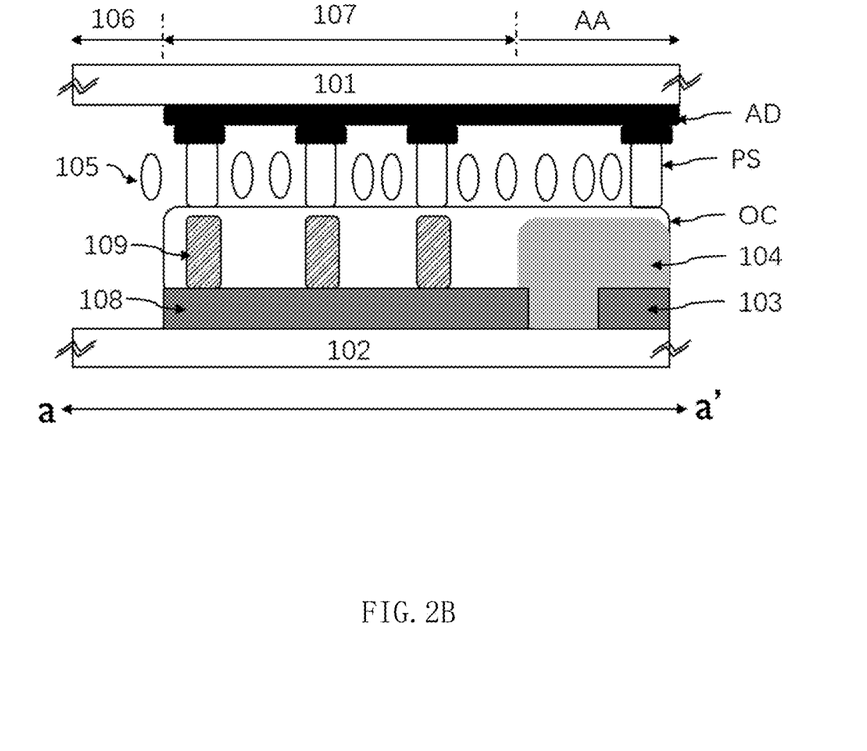
FIG. 2B is a sectional diagram along a section line a-a' in FIG. 2A.
Figure 2C:
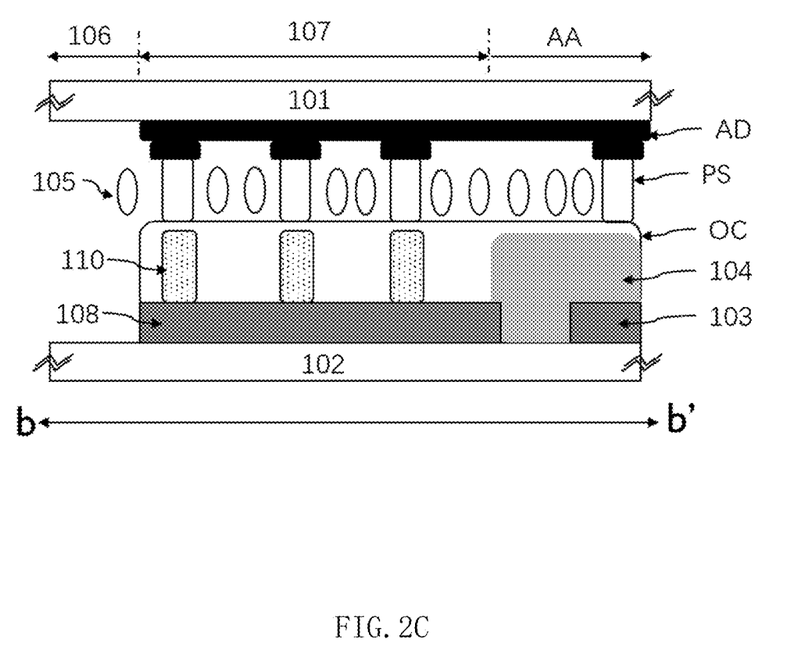
FIG. 2C is a sectional diagram along a section line b-b' in FIG. 2A.

FIG. 2A is a structural diagram of a display device in another embodiment of the invention, FIG. 2B is a sectional diagram along a section line a-a' in FIG. 2A, and FIG. 2C is a sectional diagram along a section line b-b' in FIG. 2A. As shown in FIGS. 2A-2C, in the first spacer region 107 of the display device 100, in addition to the fourth color resist layer 109, a fifth color resist layer 110 also can be disposed, and the fifth color resist layer 110 can be made of the same film layer as the first color resist layer, the second color resist layer or the third color resist layer, i.e., any one of color resists R, G and B, but the fourth color resist layer 109 and the fifth color resist layer 110 shall be made of different film layers. In this embodiment, the fifth color resist layer 110 forms a projection area S3 on the second substrate 102, and a ratio of the projection area S2 and the projection area S3 to the projection area S1 shall satisfy the following relationship: 0.01≤(S2+S3)/S1≤0.07, such that the problem of light leakage from the first light sensing region 106 can be reduced. In other words, in the first spacer region 107 of this embodiment, two different colored color resist layer units are included. In a preferable embodiment, the fourth color resist layer 109 may be color resist B, and the fifth color resist layer 110 is color resist R, which can absorb more rays within a wavelength range, and further reduce the problem of light leakage from the first light sensing region 106.

Referring to FIG. 2A again, the fifth color resist layer 110 is formed of a plurality of fifth color resist layer units, and accordingly, the projection area S3 is a sum of projection areas formed by all fifth color resist layer units on the second substrate 102. In this embodiment, for example, if each of the fifth color resist layer units is cylinder-shaped, a vertical projection thereof on the second substrate 102 is dot-shaped. Of course, the fifth color resist layer units also can be squares, ovals or other shapes, but the invention is not limited thereto. In addition, the plurality of fifth color resist layer units can be arranged uniformly, and also can be arranged dispersively. Moreover, the fourth color resist layer units and the fifth color resist layer units therebetween can be arranged uniformly, and also can be arranged dispersively, only if the ratio of S2 and S3 to S1 can be satisfied.

Of course, in another embodiment, in the first spacer region 107 of the display device 100, in addition to the fourth color resist layer 109 and the fifth color resist layer 110, a sixth color resist layer (not shown) also can be disposed, and the sixth color resist layer can be made of the same film layer as the first color resist layer, the second color resist layer or the third color resist layer, i.e., any one of color resists R, G and B, but the fourth color resist layer 109, the fifth color resist layer 110 and the sixth color resist layer shall be made of different film layers. The sixth color resist layer forms a projection area S4 on the second substrate 102, such that the first spacer region 107 includes three different colored color resist layer units. Similarly, in this embodiment, a ratio of the projection area S2, the projection area S3 and the projection area S4 to the projection area S1 shall satisfy the following relationship: $0.01 \leq (S2+S3+S4)/S \leq 0.07$.

Similarly with the fourth color resist layer 109 and the fifth color resist layer 110, the sixth color resist layer is formed of a plurality of sixth color resist layer units, and accordingly, the projection area S4 is a sum of projection areas formed by all sixth color resist layer units on the second substrate 102. For example, if each of the sixth color resist layer units is cylinder-shaped, a vertical projection thereof on the second substrate 102 is dot-shaped. Of course, the sixth color resist layer units also can be squares, ovals or other shapes, but the invention is not limited thereto. In addition, the plurality of sixth color resist layer units can be arranged uniformly, and also can be arranged dispersively. Moreover, the fourth color resist layer units, the fifth color resist layer units and the sixth color resist layer units therebetween can be arranged uniformly, and also can be arranged dispersively, only if the ratio of S2, S3 and S4 to S1 can be satisfied.

FIGS. 3A-3E are schematic diagrams of different arrangements of color resist layers in a spacer region of the invention. For sake of clear explanation, the invention only takes the fourth color resist layer 109 and the fifth color resist layer 110 for example. Of course, the sixth color resist layer also can be disposed in the first spacer region 107.

Figure 3A:
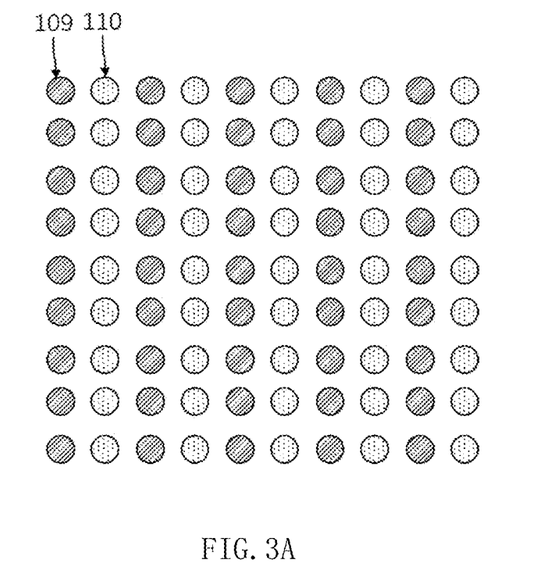
FIGS. 3A-3E are schematic diagrams of different arrangements of color resist layers in a spacer region of the invention.
Figure 3B:
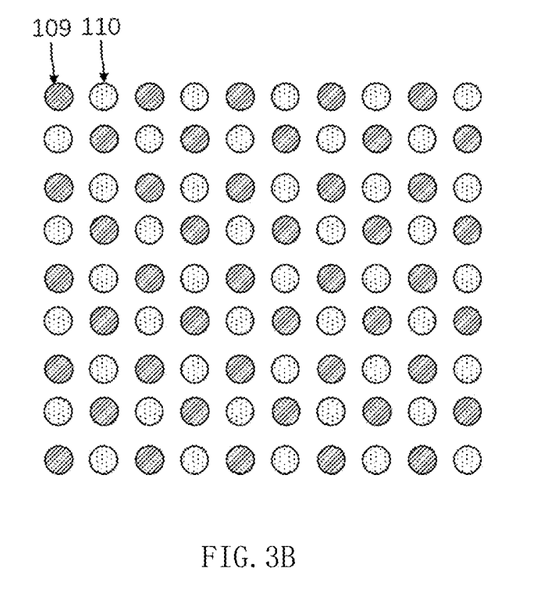

Specifically, as shown in FIGS. 3A-3E, the fourth color resist layer 109 and the fifth color resist layer 110 are spaced apart from each other. To be specific, as shown in FIGS. 3A and 3B, the fourth color resist layer 109 and the fifth color resist layer 110 are formed of a plurality of fourth color resist layer units and fifth color resist layer units, respectively, and each of the fourth color resist layer units or the fifth color resist layer units is cylinder-shaped. As shown in FIG. 3A, the fourth color resist layer units or the fifth color resist layer units are arranged in columns in a vertical direction as illustrated, and alternating each other in a horizontal direction as illustrated. As shown in FIG. 3B, the fourth color resist layer units or the fifth color resist layer units are alternating each other in a vertical direction or a horizontal direction as illustrated. In the embodiment of FIGS. 3A and 3B, process is relatively simple.

Figure 3C:
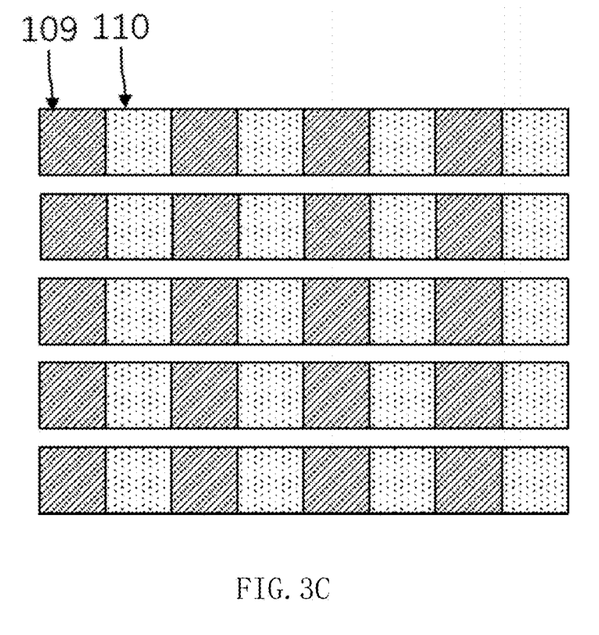
Figure 3D:
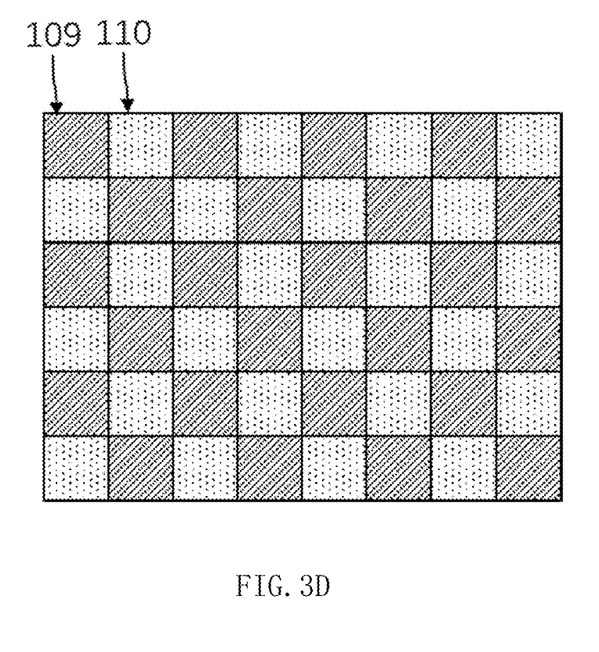
Figure 3E:
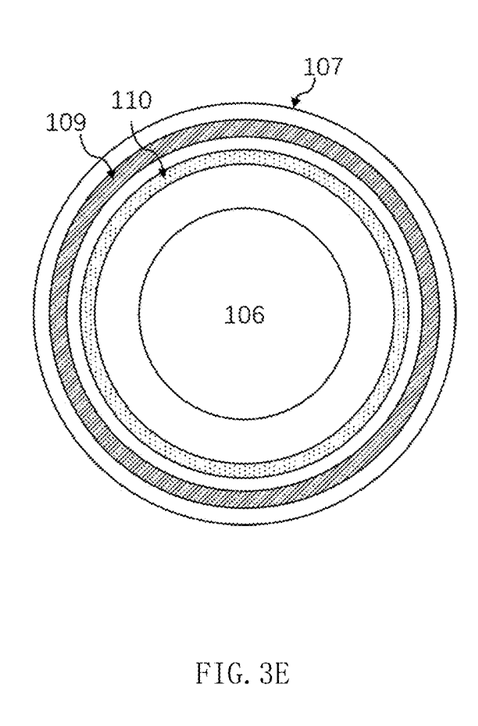

As shown in FIGS. 3C and 3D, the fourth color resist layer 109 and the fifth color resist layer 110 are formed of a plurality of fourth color resist layer units and fifth color resist layer units, respectively, and each of the fourth color resist layer units or the fifth color resist layer units is rectangle-shaped. As shown in FIG. 3C, the fourth color resist layer units or the fifth color resist layer units are arranged in columns in a vertical direction as illustrated, and alternating each other in a horizontal direction as illustrated. As shown in FIG. 3D, the fourth color resist layer units or the fifth color resist layer units are alternating each other in a vertical direction or a horizontal direction as illustrated, and like a chessboard.

Referring to FIG. 3E again, the fourth color resist layer 109, the fifth color resist layer 110 and the first spacer region 107 form a concentric ring structure. The rings formed by the fourth color resist layer 109 or the fifth color resist layer 110 can be one or more, but the invention is not limited thereto. The rings formed by the fourth color resist layer 109 or the fifth color resist layer 110 are spaced apart from each other.

As for the fourth color resist layer 109 or the fifth color resist layer 110 shown in FIGS. 3A-3E, the fourth color resist layer units or the fifth color resist layer units can be arranged uniformly, and also can be arranged dispersively, respectively, and the fourth color resist layer units and the fifth color resist layer units therebetween can be arranged uniformly, and also can be arranged dispersively.

Figure 4A:
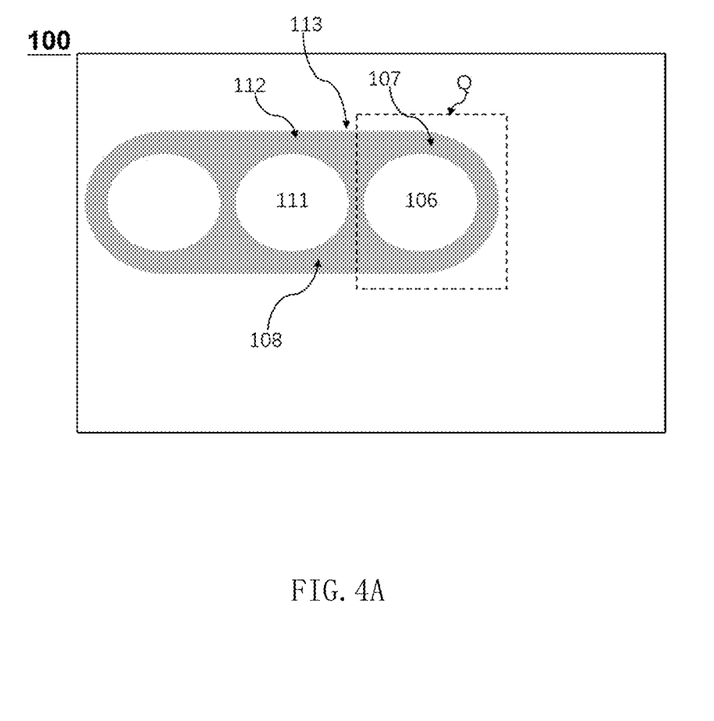
FIG. 4A is a structural diagram of a display device in still another embodiment of the invention.
Figure 4B:
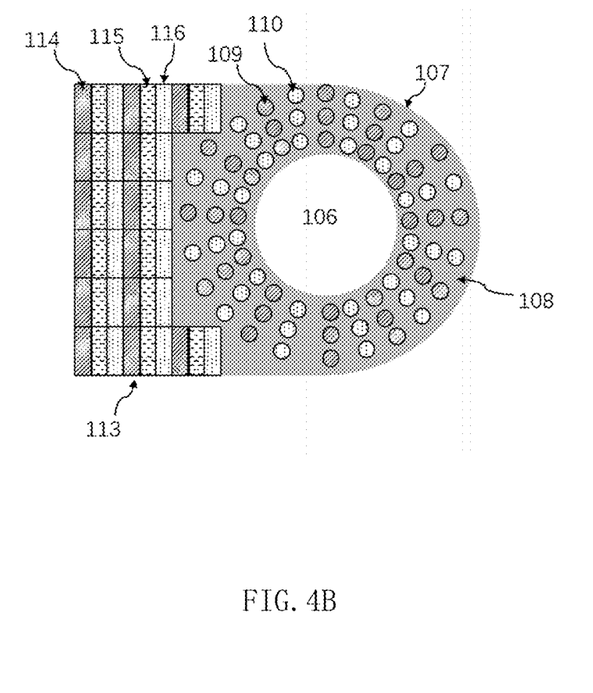
FIG. 4B is an enlarged diagram of a region Q in FIG. 4A.

FIG. 4A is a structural diagram of a display device in still another embodiment of the invention, and FIG. 4B is an enlarged diagram of a region Q in FIG. 4A. As shown in FIGS. 4A and 4B, the display device 100 has a first light sensing region 106 surrounding a first spacer region 107, and a second light sensing region 111 surrounding a second spacer region 112. The second spacer region 112 can use the same structure as the first spacer region 107, and a region between the second spacer region 112 and the first spacer region 107 can use the same structure as the color resist layer 104. Specifically, as shown in FIG. 4B, the second spacer region 112 and the first spacer region 107 have a seventh color resist layer 114, an eighth color resist layer 115 or a ninth color resist layer 116 therebetween disposed on the second substrate 102 in a strip shape. To be specific, referring to FIG. 4A, structures of the first spacer region 107 and the second spacer region 112 are the same as that in the above embodiments, as shown in FIGS. 1B, 2B and 2C. Referring to FIG. 4B simultaneously, a transition spacer region 113 is between the adjacent first spacer region 107 and second spacer region 112, and has a plurality of color resist layers. Specifically, arrangement and setting of the color resist layers in the transition spacer region 113 are the same as that of the color resist layers in the display region AA. For example, the respective color resists are disposed on the second substrate in a strip shape, and different colors are arranged alternatively. In addition, in the transition spacer region 113, the second light shield layer 108 is disposed in the entire region, which is different from patterning of the opening of the first light shield layer 103 in the display region AA, such that the color resist layers cover the second light shield layer 108, not received in the opening.

In conclusion, according to the embodiments of the invention, since color resist layers with a certain density are disposed in the spacer region, it is possible to better maintain thicknesses of planarization layers, reduce leakage of a single colored ray from an isolated region, lower influence of light leakage on optical sensing elements, and improve appearance effect of the product.

Of course, the invention also may have various other embodiments, and those skilled in the art shall make various corresponding modifications and variations without departing from spirit and essence of the invention, but these corresponding modifications and variations shall belong to the scope protected by the appended claims of the invention.

INDUSTRIAL PRACTICABILITY

Application of the display device of the invention has the following advantageous effects:

since color resist layers with a certain density are disposed in the spacer region, it is possible to better maintain thicknesses of planarization layers, reduce leakage of a single colored ray from an isolated region, lower influence of light leakage on optical sensing elements, and improve appearance effect of the product.

What is claimed is:

1. A display device, comprising: a first substrate having a display region and a peripheral region adjacent to each other; a second substrate having a first light shield layer and a color resist layer, the color resist layer having a first color resist layer, a second color resist layer and a third color resist layer disposed on the first light shield layer in a strip shape, respectively; a display molecular layer disposed between the first substrate and the second substrate; a first light sensing region disposed on the first substrate and the second substrate; a first spacer region surrounding the first light sensing region, and the first spacer region further comprising a second light shield layer and a fourth color resist layer; the second light shield layer forming a first projection area on the second substrate; the fourth color resist layer forming a second projection area on the second substrate; wherein a ratio of the second projection area to the first projection area is between 0.01 and 0.07.

2. The display device according to claim 1, further comprising a second light sensing region, and a second spacer region surrounding the second light sensing region.

3. The display device according to claim 2, wherein the first spacer region and the second spacer region have a seventh color resist layer, an eighth color resist layer or a ninth color resist layer therebtween disposed on the second substrate in a strip shape.

4. The display device according to claim 1, wherein the fourth color resist layer uses the same film layer as the first color resist layer, the second color resist layer or the third color resist layer.

5. The display device according to claim 4, wherein the fourth color resist layer has a plurality of fourth color resist layer units.

6. The display device according to claim 5, wherein each of the fourth color resist layer units is cylinder-shaped, and a vertical projection of each of the fourth color resist layer units on the second substrate is dot-shaped.

7. The display device according to claim 5, wherein the plurality of fourth color resist layer units are arranged uniformly.

8. The display device according to claim 1, wherein the first spacer region further comprises a fifth color resist layer forming a third projection area on the second substrate, wherein a ratio of a sum of the second projection area and the third projection area to the first projection area is between 0.01 and 0.07.

9. The display device according to claim 8, wherein the fifth color resist layer uses the same film layer as the first color resist layer, the second color resist layer or the third color resist layer.

10. The display device according to claim 9, wherein the fifth color resist layer has a plurality of fifth color resist layer units.

11. The display device according to claim 10, wherein the plurality of fifth color resist layer units are arranged uniformly.

12. The display device according to claim 8, wherein the first spacer region further comprises a sixth color resist layer forming a fourth projection area on the second substrate, wherein a ratio of a sum of the second projection area, the third projection area and the fourth projection area to the first projection area is between 0.01 and 0.07.

13. The display device according to claim 12, wherein the sixth color resist layer uses the same film layer as the first color resist layer, the second color resist layer or the third color resist layer.

14. The display device according to claim 13, wherein the fourth color resist layer, the fifth color resist layer and the sixth color resist layer are different film layers.

15. The display device according to claim 14, wherein the fourth color resist layer has a plurality of fourth color resist layer units, the fifth color resist layer has a plurality of fifth color resist layer units, and the sixth color resist layer has a plurality of sixth color resist layer units.

16. The display device according to claim 15, wherein each of the fourth color resist layer units, the fifth color resist layer units or the sixth color resist layer units is cylinder-shaped, and a vertical projection of each of the fourth color resist layer units, the fifth color resist layer units or the sixth color resist layer units on the second substrate is dot-shaped.

17. The display device according to claim 16, wherein the plurality of fourth color resist layer units, the plurality of fifth color resist layer units or the plurality of sixth color resist layer units are arranged uniformly.

18. The display device according to claim 16, wherein the plurality of fourth color resist layer units, the plurality of fifth color resist layer units or the plurality of sixth color resist layer units are arranged to be spaced apart from each other.

* * * * *